March 4, 1969    R. PAULSEN ET AL    3,431,007

HANDLE ASSEMBLY

Filed March 9, 1967

INVENTOR.
ROY PAULSEN
BY   RONALD L. DAY

Charles S. Penfold
ATTORNEY

United States Patent Office 3,431,007
Patented Mar. 4, 1969

3,431,007
HANDLE ASSEMBLY
Roy Paulsen, 748 Water St., Hobart, Ind. 46342, and Ronald L. Day, 611 Gladys St., Michigan City, Ind. 46360
Filed Mar. 9, 1967, Ser. No. 621,980
U.S. Cl. 294—31.2                                    7 Claims
Int. Cl. A47j 45/10

ABSTRACT OF THE DISCLOSURE

The invention is directed to a handle assembly which comprises a handle and a band for supporting a container and an extension on the band which is slidably adjustable in the handle, and the handle is provided with a forwardly extending formation for engaging a container in order to stabilize the connection between the band and container.

---

Figure 1:
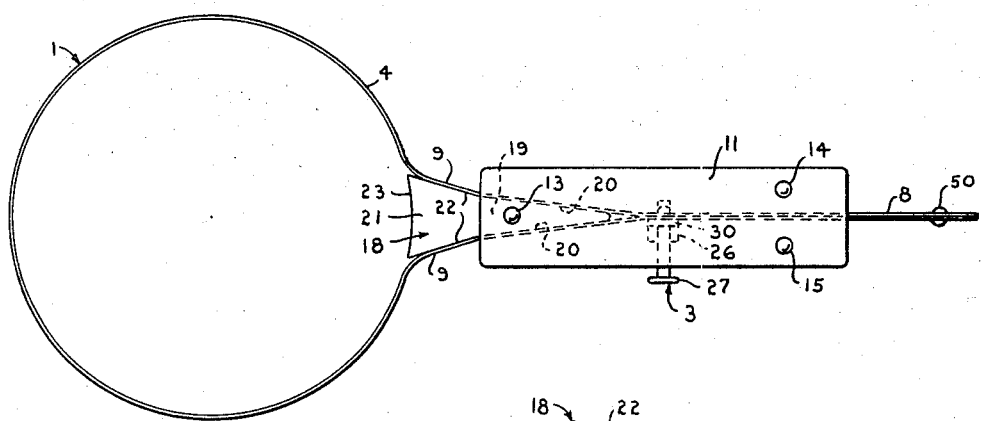

The subject invention relates generally to culinary equipment and more particularly is directed to a handle assembly for supporting containers.

A significant objective of the invention is to provide a handle assembly designed and constructed for use in supporting containers of a disposable character.

An important objective of the invention is to provide a handle assembly which comprises an elongated resiliently flexible support and an elongated handle.

More particularly, an object of the subject invention is to provide an assembly in which the support is constructed in one-piece and is formed to provide expansible-contractible means at one extremity thereof for receiving a container and a pair of corresponding lateral arms constituting an opposite extremity for connection with the handle of the assembly.

Also, a specific object of the invention is to construct the arms of the support so they include a pair of correspondingly normally divergent straight continuations and a pair of adjacent corresponding merging or converging portions which join the receiving means and the straight continuations.

A further objective of the invention is to provide an improved handle comprising a body which is preferably provided with a primary longitudinal opening or guide at one extremity thereof and a pair of secondary converging openings or guides at its opposite extremity which constitute continuations of the primary opening, all of which serve to slidably accommodate the straight continuations and convergent portions of the support.

A specific but important objective of the invention is to provide a handle with a substantially triangular formation which has an inner pair of converging marginal edges which constitute inner sides of the secondary openings and a portion which extends forwardly and has a pair of outer converging edges having a greater included angle of convergence than the inner edges, all of which are arranged so that the straight continuations may resiliently conform to the primary and secondary openings and convergent portions of the support will engage the outer edges of the formation.

An additional objective of the invention is to provide a handle with a formation of the character, above referred to, in which its forwardly extending portion is preferably provided with an inset arcuate edge for engaging a peripheral portion of a container in a manner whereby to assist in stabilizing the connection between the handle assembly and a container.

Also, an objective of the invention is to provide an organization in which the straight continuations of the support are preferably provided with cooperating means in the form of rows of longitudinally-spaced holes and the handle is provided with a locking device preferably in the form of a transverse movable pin having an inner end which may be caused to extend into any of the pairs of holes for locking the support in any desired longitudinal position with respect to the handle and thereby provide an organization in which the receiving means or the support may be caused to substantially surround and/or grip containers having variable cross-sectional dimensions.

Additional objects of the invention reside in providing a handle assembly which offers advantages with respect to manufacture and assembly, efficiency and durability.

Other objects and advantages will appear after the description hereinafter set forth is considered in conjunction with the drawings annexed hereto.

Figure 4:
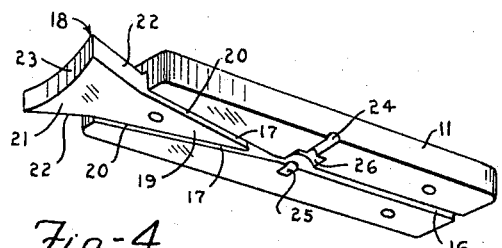
Figure 2:
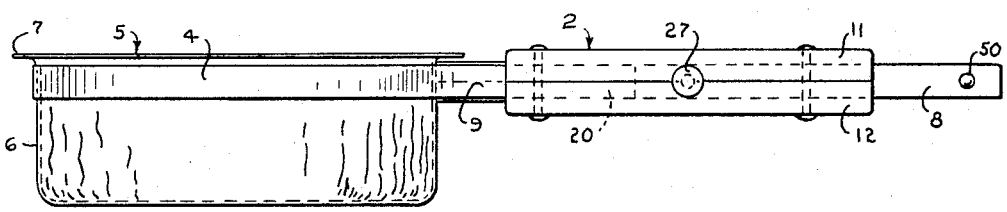
Figure 5:
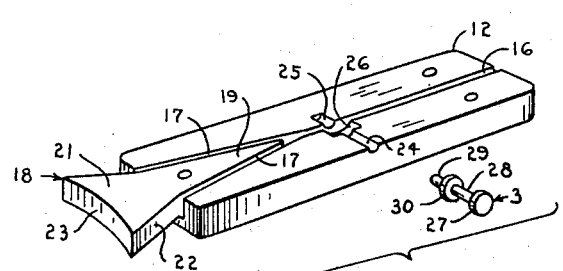
Figure 3:
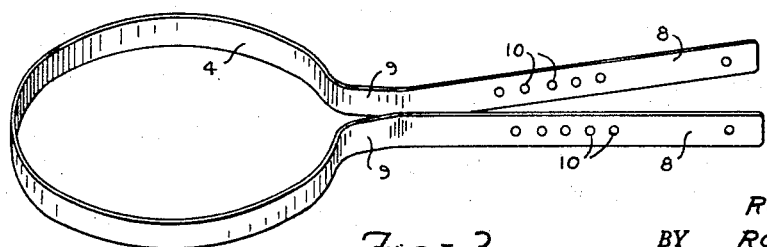

FIGURE 1 is a top view of the handle assembly;
FIGURE 2 is a side elevational view of the assembly illustrated in FIGURE 1 showing the handle assembly supporting a container;
FIGURE 3 is a pictorial view of the support constituting a component of the handle assembly;
FIGURE 4 is a perspective view showing the internal structure of one of a pair of half sections of the handle; and
FIGURE 5 is a view similar to FIGURE 4 showing the internal structural characteristics of the other half section of the handle, including a locking device carried by the sections of the handle for selective connection with the support.

Referring more particularly to the drawings, the handle assembly comprises an elongated support generally designated 1, an elongated handle 2, and a locking device 3 which is carried by the handle.

The support may be designed and constructed in various ways but, as illustrated, includes means at one extremity preferably in the form of a substantially annular portion, band, or loop 4 for receiving and supporting a container generally designated 5 having a body portion 6 and a rim 7.

More specifically, the support is preferably of a resiliently flexible character, constructed in one piece, and also includes a pair of corresponding relatively long lateral arms at its opposite extremity having straight continuations 8 which are joined to the band or loop 4 by a pair of merging or convergent portions 9 at the junctions between said arms and receiving means. As depicted in FIGURE 3, the continuations 8 are normally divergent and provided with cooperating means, preferably in the form of aligned mating pairs of apertures or holes 10, for selectively receiving an end of the locking device 3 in a manner whereby the support may be locked in any one of a plurality of longitudinal positions with respect to the handle.

The handle 2 may also be designed and constructed in various ways but, as exemplified herein, it comprises a body composed of a pair of corresponding halves or sections 11 and 12, which are preferably secured together by a plurality of rivets 13, 14, and 15. These sections may be constructed from any material desired, but a molded plastic would appear to be the most suitable.

More specifically, the inner side of each of the sections, as illustrated in FIGURES 4 and 5 is provided with a centrally disposed longitudinally extending straight groove 16 at one extremity and with a pair of corresponding angularly disposed straight grooves 17 at its opposite extremity which constitute branch continuations of the grooves 16. Each of the sections is also provided with an integral generally triangular formation generally designated 18 which includes a portion 19 having a pair of edges 20 which constitute marginal surfaces of the grooves 17. Otherwise expressed, each of the portions 19 is disposed within the confines of its section and is more or less defined by the grooves 17.

The formation 18 is also provided with a forwardly extending portion 21 having side bearing edges 22 which constitute continuations of the edges 20. The extending portion 21 of each section is preferably provided with an inset arcuate bearing edge 23.

Each of the handle sections is further provided with holes through which the fasteners 13, 14, and 15 extend and with transversely semi-circular slots 24 and 25 and an intervening semi-circular recess 26. It will be noted that the fastener 13 extends through the formations 18 and that the fasteners 14 and 15 extend through the sections on opposite sides of the mating grooves 16 in order to provide a well balanced and stable handle.

The locking device 3 preferably includes a manually engagable knob 27, a cylindrical portion 28, a cylindrical portion 29 constituting a detent, and an enlargement 30 therebetween.

When the sections 11 and 12 are secured together by the fasteners 13, 14, and 15, with the locking device 3 therebetween, as shown in FIGURES 1 and 2, the opposed surfaces of the sections will be held in engagement in a manner whereby the mating grooves 16 will define the primary longitudinal opening, the converging mating grooves 17 the pair of secondary openings, and the edges 23 will form a relatively large arcuate bearing area generally conforming to the inner surface of the band 4 for engaging the periphery of the body portion 6 of the container and thereby assist in providing a stabilized connection between a handle assembly and the container when the expansible-contractible receiving means 4 surrounds and/or grips the body portion, with the lip 7 acting as a stop to prevent downward movement of the container through the means 4.

When the locking device is correctly assembled between the sections, the knob 27 will be exposed at one side of the handle for convenient manipulation and the cylindrical portions 28 and 29 will be slidable and rotatable in openings defined by the pairs of mating grooves 24 and 25, and the recesses 26 will form a chamber or pocket for the enlargement 30 which serves to hold the device in locked relation to the handle and limit its longitudinal movement. The device may be readily manipulated so that its detent 29 may be extended into any one of the aligned pairs of apertures or holes 10 for selectively positioning the support in any desired longitudinal operative position with respect to the handle. The primary longitudinal opening and the secondary openings define what may be termed a Y-shaped guide means.

Attention is directed to the fact that the support and the locking device 3 may be interposed between the handle sections for assembly with the latter or, if desired, the support may be connected to the handle after the latter is assembled by merely simultaneously inserting the free ends of the continuations 8 into the outer ends of the secondary openings and then forcing these continuations successively through and in conforming relation to these openings and the longitudinal opening to the position shown, for example in FIGURE 1, with the convergent portions 9 bearing against the edges 22 of the extended portion 21 of the formation 18, with portions of the continuations extending rearwardly of the handle so that, if desired, they may be manually gripped to facilitate conformance of the continuations and convergent portions to the handle and efficient gripping or embracement of the container.

If found desirable, a fastener, such as 50, may be detachably secured to the outer ends of the arms 8 after the support and handle are assembled. The fastener may be extended through holes provided therefor in the arms and may serve as a stop for limiting longitudinal movement of the support in one direction or in preventing its accidental disconnection from the handle.

Attention is directed to the fact that the continuations 8 of the support are preferably normally divergent and resilient and are adapted for slidable disposition in the primary and secondary openings, and since the continuations are normally divergent, the support member may be temporarily frictionally held in any longitudinal position to which it may be adjusted.

It should be observed that the continuations 8 will adjust themselves to the convergent secondary openings defined by the grooves 17, that the merging portions 9 of the support are adapted to engage the outer converging side surfaces or edges of the forwardly extending portion 21 of the formation 18, and that the arcuate surfaces of the portions 23 jointly engage the periphery of the body portion 6 of the container.

Attention is directed to the fact that an important feature of the invention resides in providing the handle with the formations 18 so that the portions 21 thereof project forwardly of the handle sections 11 and 12 of the body and thereby promote stabilization between a container and the receiving means 4 of the support. The inner portions 19 of the formations and the bearing area defined by the surfaces 23 also assist in providing a stable connection between the support and the handle as well as between the container and the support.

We claim:

1. A handle comprising an elongated body having a pair of sections forming a longitudinal opening in a rear extremity thereof and a pair of angularly disposed openings in a fore extremity thereof and constituting continuations of said longitudinal opening, immovable means respectively carried by said sections arranged between said angularly disposed openings and having portions extending forwardly of said fore extremity and said portions being provided with corresponding mating, surfaces for engaging a container adapted to be held thereagainst by means slidable in all of said openings.

2. The handle defined in claim 1, in which said body sections are provided with mating grooves which defined all of the openings.

3. The handle defined in claim 1, including an elongated support having an outer extremity for embracing a container and inner extremities slidable in all of said openings, and a transversely movable locking device is held between the sections for locking the support in place without removing the device from the handle.

4. In combination: a handle comprising an elongated body having a longitudinal opening in a rear extremity thereof and a pair of angularly disposed openings in a fore extremity thereof and constituting continuations of said longitudinal openings, an elongated support provided with means at one extremity for embracing a container and an opposite extremity comprised of corresponding arms slidably disposed in said openings, and means carried substantially midway of the length of said handle and being operable while connected thereto for locking the support in any desired position of longitudinal adjustment relative to said handle.

5. The combination defined in claim 4, in which said body is provided with substantially triangular formations having sides which are engaged by said arms, and said formations include portions extending forwardly of said fore extremity for disposition between said arms for engaging a container.

6. The combination defined in claim 4, in which said arms are provided with aligned apertures, and said body comprises a pair of sections provided with a locking device which is held between said sections for selective reception in said apertures while the device is carried by said body.

7. In combination: a handle comprising an elongated body having a longitudinal opening in a rear extremity thereof and a pair of angularly disposed openings in a fore extremity and constituting continuations of said longitudinal opening, said body also being provided with a formation extending forwardly of said fore extremity, an elongated support provided with means at one extremity for embracing a container and an opposite extremity comprising arms slidably disposed in said openings, means for locking the embracing means for holding a container against said formation, and means carried by said opposite extremity of said support and located externally of said handle for maintaining said handle and said support assembled.

References Cited

UNITED STATES PATENTS

| 1,953,238 | 4/1934 | Kosanovich | 294—31.2 X |
| 2,946,619 | 7/1960 | Wahl | 294—74 |

FOREIGN PATENTS

| 234,488 | 6/1909 | Germany. |

ANDRES H. NIELSEN, *Primary Examiner.*